United States Patent [19]

Baur, deceased

[11] Patent Number: 5,335,985

[45] Date of Patent: * Aug. 9, 1994

[54] STORAGE UNITS FOR COMPUTER TAPE CASSETTES

[75] Inventor: Rolf Baur, deceased, late of Heubach-Lautern, Fed. Rep. of Germany, by Helga Baur, heir

[73] Assignee: Grau GmbH & Co., Fed. Rep. of Germany

[ * ] Notice: The portion of the term of this patent subsequent to Feb. 18, 2009 has been disclaimed.

[21] Appl. No.: 982,182

[22] Filed: Nov. 25, 1992

Related U.S. Application Data

[63] Continuation of Ser. No. 787,917, Nov. 6, 1991, abandoned, which is a continuation of Ser. No. 456,689, Dec. 28, 1989, abandoned, and a continuation-in-part of Ser. No. 456,688, Dec. 28, 1989, Pat. No. 5,088,604, and a continuation-in-part of Ser. No. 869,118, Apr. 15, 1992, Pat. No. 5,158,345, which is a continuation of Ser. No. 551,637, Jul. 12, 1990, abandoned, which is a continuation of Ser. No. 306,181, Feb. 6, 1989, abandoned.

[30] Foreign Application Priority Data

Aug. 9, 1988 [DE] Fed. Rep. of Germany ....... 3830486
Oct. 10, 1988 [DE] Fed. Rep. of Germany ....... 3834389

[51] Int. Cl.$^5$ .............................................. A47F 1/04
[52] U.S. Cl. ................................ 312/9.31; 312/319.6; 312/298; 211/163
[58] Field of Search ................ 312/9.1, 9.9, 9.29, 312/9.31, 9.32, 97.1, 140.1, 298, 319.6; 211/1.5, 163

[56] References Cited

U.S. PATENT DOCUMENTS

| 729,642 | 6/1903 | Nash | 211/121 X |
|---|---|---|---|
| 2,512,465 | 6/1950 | Moorhouse | 211/1.5 X |
| 4,609,232 | 9/1986 | Florence | 312/16 |
| 4,844,564 | 7/1989 | Price, Sr. et al. | 312/12 |
| 4,850,658 | 7/1989 | Sawdor | 312/252 X |
| 5,015,139 | 5/1991 | Baur | 414/281 |
| 5,088,604 | 2/1992 | Baur et al. | 211/1.5 |

FOREIGN PATENT DOCUMENTS 3906017 8/1990 Fed. Rep. of Germany ... 312/319.6

Primary Examiner—Kenneth J. Dorner
Assistant Examiner—Gerald A. Anderson
Attorney, Agent, or Firm—Nixon & Vanderhye

[57] ABSTRACT

Computer tape cassette storage units store a number or computer tape cassettes during periods of nonuse and are particularly adapted for use in an automated tape cassette archiving and retrieval system. The storage units include at least one shelf unit having a substantially horizontally disposed shelf for supporting a row of computer tape cassettes on edge. Structures are provided so as to minimize (if not eliminate) the possibility that the tape cassettes will become dislodged from the shelf units in the event of mechanical shocks and/or vibrations (e.g., which may occur in an automated system do to a robotic manipulator coming into physical contact with the storage unit). Such structure may take the form of a forward lip against which a portion of the tape cassettes abuts and/or structures which shift the centers of gravity of the tape cassettes rearwardly toward the rear wall of the shelf units upon which they are supported.

4 Claims, 6 Drawing Sheets

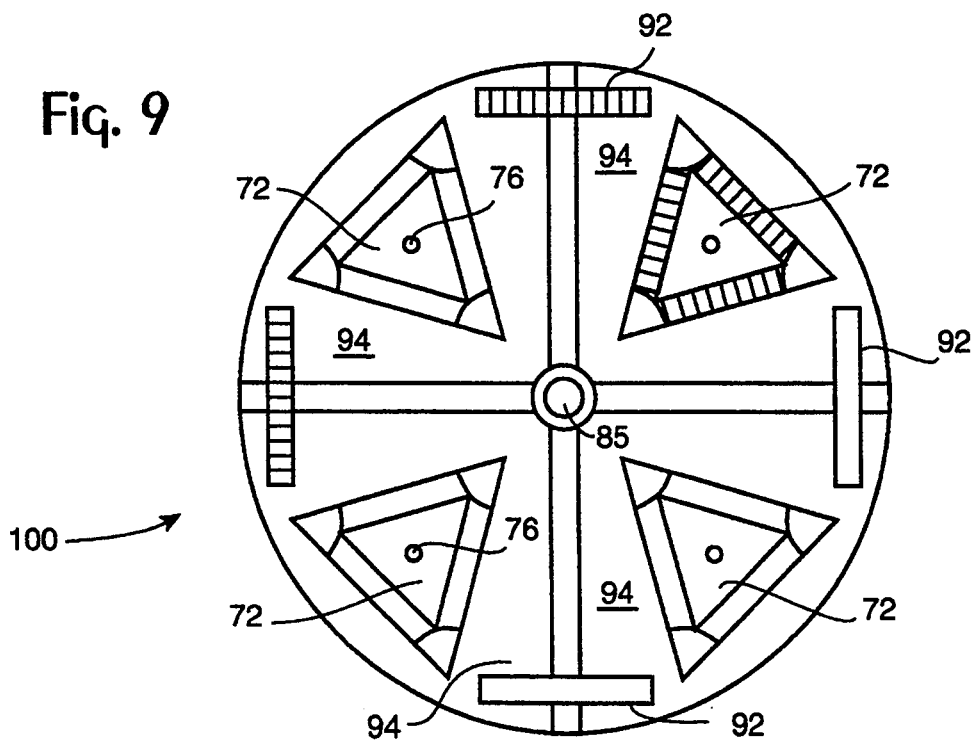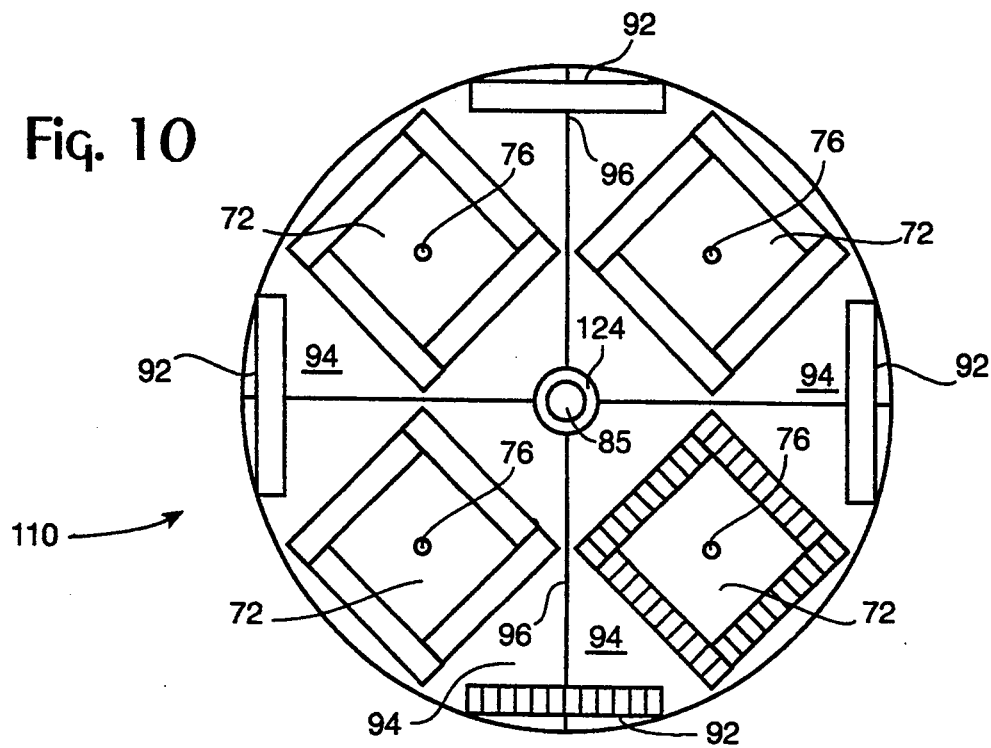

STORAGE UNITS FOR COMPUTER TAPE CASSETTES

CROSS-REFERENCE TO RELATED APPLICATIONS

A. 35 USC §120 Applications

This application is a continuation of now abandoned U.S. application Ser. No. 07/787,917 filed on Nov. 6, 1991, which in turn is a continuation of now abandoned U.S. application Ser. No. 07/456,689 filed on Dec. 28, 1989 and a continuation-in-part of U.S. application Ser. Nos. 07/456,688 filed on Dec. 28, 1989 (now U.S. Pat. No. 5,088,604), and 07/869,118 filed on Apr. 5, 1992 (now U.S. Pat. No. 5,158,345), which in turn is a continuation of now abandoned application Ser. No. 7/551,637 filed on Jul. 12, 1990, which in turn is a continuation of now abandoned application Ser. No. 7/306,181 filed on Feb. 6, 1989, the entire content of each application cited above being expressly incorporated hereinto by reference.

B. Other Applications

This application may also be deemed related to U.S. application Ser. Nos. 07/391,284 filed on Aug. 9, 1989 (now U.S. Pat. No. 5,015,139) and 07/906,384 filed on Jun. 30, 1992 (which in turn is a continuation of now abandoned application Ser. No. 07/758,506 filed on Sep. 6, 1991, which in turn is a continuation of now abandoned application Ser. No. 07/410,069 filed on Sep. 21, 1989), the entire content of each application cited above being expressly incorporated hereinto by reference.

FIELD OF INVENTION

This invention relates to the field of computer tape cassette archiving systems. Note specifically, the present invention relates to tape storage units which store computer tape cassettes during periods of non-use and which are especially adapted for use in automated tape cassette archiving and retrieval systems (e.g., of the type disclosed in the above-identified related U.S. Patent Applications).

BACKGROUND AND SUMMARY OF THE INVENTION

Today's large scale computer rooms typically employ human technicians which manually load magnetic data storage media (e.g. magnetic tapes) onto computer drives. With the recent advent of computer tape cassettes (i.e., as represented by the 3480 compatible system), the space requirement for physically cataloging and storing the magnetic media has decreased (due to the decreased size of these tape cassettes as compared to the more conventional magnetic tape spools).

In the above-identified copending U.S. Patent Applications, there are disclosed novel robot transport systems having particular utility in the automated archiving and retrieval of computer data tape cassettes. In particular, the robot transport systems disclosed in those copending U.S. Patent Applications allow computer tape cassettes to be moved between a tape storage facility (where individual tape cassettes are archived) and a tape drive section (composed of individual tape drive units).

According to one aspect of the present invention, rotatable tape cassette storage carousels are provided which are especially adapted for use in the automated tape cassette archiving and retrieval systems disclosed in the above-identified copending U.S. Patent Applications. In general, the storage carousels of this invention include a number of vertically stacked shelf units each having a generally horizontally oriented shelf for supporting a row of tape cassettes on edge. The stacked shelf units are positioned a predetermined radial dimension from a central support shaft which is rotatably coupled to a motor-driven pedestal. Position sensors are provided in operative association with the carousel so that its particular rotational position may be sensed by appropriate supervisory controls associated with the automated tape cassette archiving and retrieval systems (e.g., to ensure that the correct shelf unit holding a preselected tape cassette is rotated into confronting relationship to a robotic manipulator associated with the robot transport system).

As may be appreciated, the above-noted aspect of the present invention provides for the practical storage, access, and retrieval of computer tape cassettes through the use of a storage unit which requires relatively little floor space. Additional unutilized storage space, however, may exist in the interior of single carousel storage units. Thus, according to another aspect of the present invention, a single tape cassette storage unit is provided with a plurality of rotatable tape cassette storage carousels, with each carousel connected to a single, central support shaft of the storage unit which is rotatably coupled to a drive transfer mechanism.

In general, each carousel includes a number of vertically stacked shelf units each having a generally horizontally oriented shelf for supporting a row of tape cassettes on edge. The stacked shelf units of each individual carousel are positioned a predetermined radial dimension from that carousel's central support shaft, which is rotatably coupled to a drive transfer mechanism. Each carousel rotates around its own rotation axis (the carousel's rotation axis), and all the carousels revolve around the storage unit's rotation axis.

The carousels' central support shafts are positioned a predetermined radial dimension from the storage unit's central support shaft so that the carousels do not interfere with (or touch) one another or the storage unit's central support shaft. The carousels' central support shafts are rotatably coupled to a drive means (e.g., a reversible motor) via a drive transfer means (e.g., comprising gears, belts, cables, and/or the like housed or partially housed in the supporting framework of the storage unit). Position sensors may be provided in operative association with the carousels so that the position of each carousel and each carousel's particular rotational position may be sensed by appropriate supervisory controls associated with the automated tape cassette archiving and retrieval systems (e.g., to ensure that the correct shelf unit holding a preselected tape cassette is rotated into confronting relationship to a robotic manipulator associated with the robot transport system).

According to another aspect of the present invention, additional secondary shelf units are arranged at the outer periphery of the tape cassette storage unit and are rigidly connected to the storage unit's central support shaft (which is rotatably coupled to a drive transfer mechanism). These additional secondary shelf units are arranged at the outer periphery of the storage unit in the open intermediate zones defined by adjacent carousels. The additional secondary shelf units are arranged in these open areas between adjacent carousels, i.e., in the intermediate zones, so that the area occupied by a tape cassette storage unit may be optimally utilized for the storage of tape cassettes. Thus, both the outer periphery and the interior of a tape cassette storage unit may be more fully utilized for storage purposes while also allowing for rapid, efficient access and tape retrieval from the periphery of the storage unit.

Position sensors may be provided in operative association with the secondary shelf units so that their particular rotational position (e.g., with respect to the storage unit's central shaft) may be sensed by appropriate supervisory controls associated with the automated tape cassette archiving and retrieval systems (e.g., to ensure that the correct shelf unit holding a preselected tape cassette is rotated into confronting relationship to a robotic manipulator associated with the robot transport system).

As may be further appreciated, it is difficult (if not impossible) to eliminate entirely the possibility that a robotic manipulator will come into physical contact with the tape cassette storage unit during insertion/removal of a tape cassette into/from its particular location on the self. That is, while the controls may be designed so as to accurately guide the robotic manipulator relative to the tape storage units, it is usually inevitable that some misalignment between the tape storage unit and the robotic manipulator will occur. Thus, when attempting to insert/remove a tape cassette into/from the tape storage unit, the robotic manipulator may come into physical contact with the storage unit thereby causing mechanical shock and/or vibrations to occur. These mechanical shocks and/or vibrations may, moreover, be of such a magnitude that some of the tape cassettes may be dislodged physically from their shelf and thus tumble to the computer room floor. Needless to say, such an occurrence is extremely disruptive to an automated system since human intervention is then needed to re-shelve the dislodged computer tape cassettes. Therefore, any commercially acceptable tape cassette archiving and retrieval system must be capable of tolerating equipment "crashes" as may occur between the robotic manipulator and the tape cassette storage units.

Thus, according to a further aspect of this invention, the tape storage units are provided with means which serve to maintain the tape cassettes in their respective locations and thus minimize (if not eliminate) the possibility that the tape cassettes will become dislodged from their respective shelves in response to mechanical shocks and/or vibrations. The self units may therefore simply be provided with a raised forward lip extending the entire transverse length of the shelf to thereby serve as a stop member against which the tape cassettes abut. Alternatively (or conjunctively) means may be provided so as to, in effect, rearwardly displace the tape cassettes' centers of gravity. In this manner, the tape cassettes are encouraged to remain on the self (i.e., due to their centers of gravity being displaced away from the open front of the shelf) when the tape storage unit experiences mechanical shocks and/or vibrations.

Other aspects and advantages of this invention will become more clear after careful consideration is given to the detailed description of the preferred exemplary embodiment thereof which follows.

BRIEF DESCRIPTION OF THE ACCOMPANYING DRAWINGS

Reference will hereinafter be made to the accompanying schematic drawings wherein like reference numerals throughout the various FIGS. denote like structural elements, and wherein.

FIG. 9 is a top elevational view of a rotatable tape cassette storage unit according to the present invention, which includes four rotatable triangular carousels and four additional secondary shelf units positioned at the outer periphery of the storage unit in the intermediate zones between adjacent carousels; and FIG. 10 is a top elevational view of a rotatable tape cassette storage unit according to the present invention, which includes four square carousels and four additional secondary shelf units positioned at the outer periphery of the storage unit in the intermediate zones between adjacent carousels.

DETAILED DESCRIPTION OF THE PREFERRED EXEMPLARY EMBODIMENTS

Figure 1:
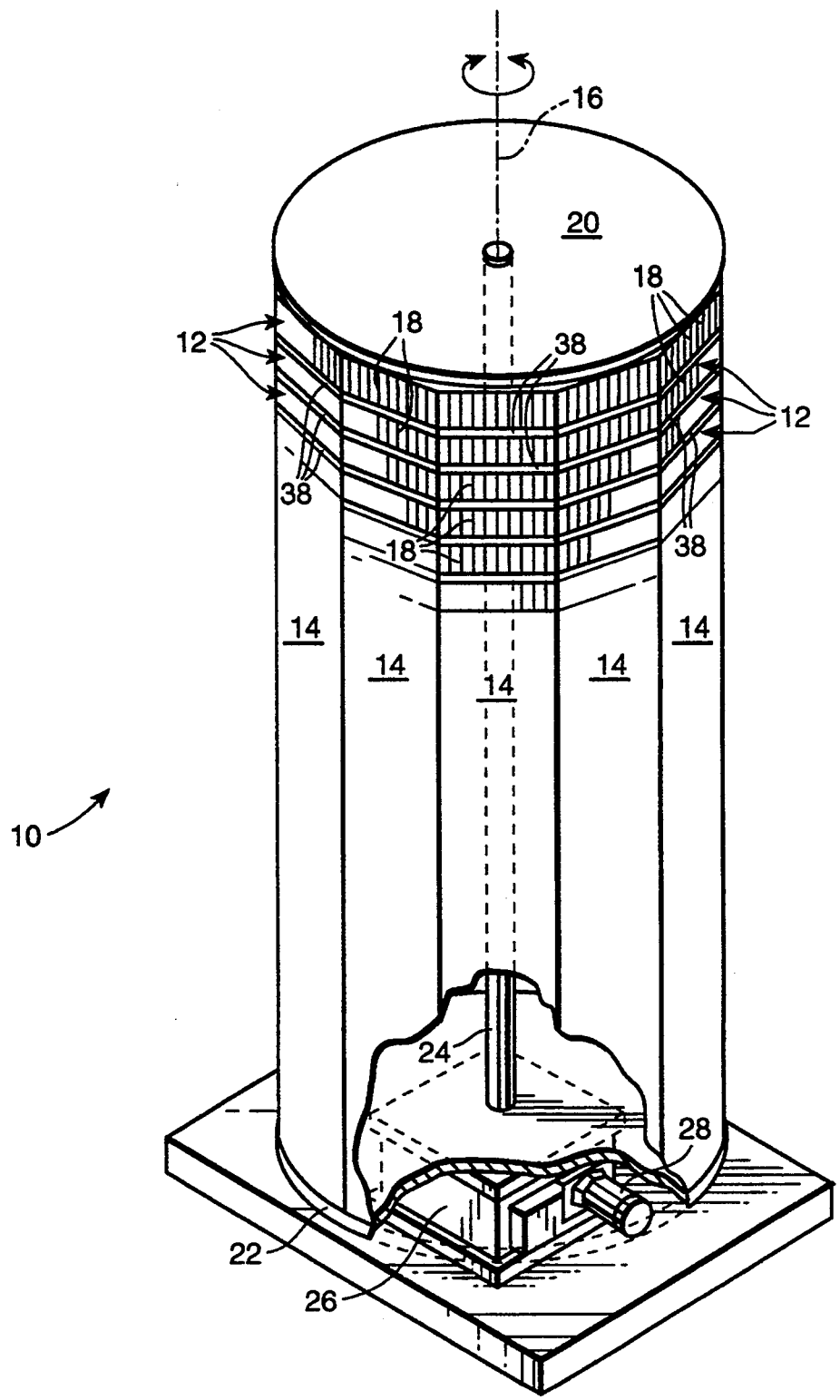
FIG. 1 is a perspective elevational view of a rotatable tape cassette storage carousel according to the present invention.

A tape storage carousel 10 according to the present invention is shown in schematic perspective elevation in accompanying FIG. 1. As is seen, the carousel 10 is generally cylindrical in configuration and includes a number of vertically stacked, open-front shelf units 12. The stacks of shelf units 12 thereby collectively establish respective columns 14 positioned substantially equal radial distances from the rotation axis 16 about which the entire carousel 10 rotates. The individual shelf units thereby serve to support a number of computer tape cassettes on their respective side edges (a representative number of tape cassettes is identified in FIG. 1 by reference numeral 18).

The columns 14 of shelf units 12 are positionally maintained by means of upper and lower mounting plates 20, 22, respectively. A central shaft 24 is vertically disposed within the open interior space of the carousel and is connected rigidly at its upper end to the upper mounting plate 20, and is journally coupled at its lower end to a drive pedestal 26. The mounting plates 20, 22 together with the central shaft 24 thereby provide a frame onto which the shelf units may be mounted. Drive pedestal 26 houses suitable gears (or like power transmission structure) and thereby serves to operatively couple the output of reversible motor 28 to the shaft 24 so as to enable the shaft 24 (and hence the entire carousel 10) to rotate about axis 16.

In use, a computer room operator will select a particular tape cassette to be inserted into a particular tape drive unit with which the carousel is operatively associated (i.e., by inputting the identity of the tape cassette and the particular tape drive unit into a suitable master control system). The master control system will have the physical location of the tape cassette stored in memory (e.g., in an electronic "look-up" table) and will thus issue an output signal to the motor 28 to thereby rotate the carousel 10 in a predetermined direction about axis 16. The carousel is thereby rotated until that column 14 of shelf units 12 which contains the selected tape cassette is in confronting relationship to a robotic manipulator (not shown), at which time rotation of the carousel 10 is stopped. At that time, the master control system may then issue the appropriate commands to the robotic manipulator so that the selected tape cassette is removed from its location in the carousel 10, transported to a selected tape drive unit, and inserted thereinto for use. Of course, re-shelving of the tape cassette after removal from the tape drive unit would proceed in an opposite manner.

As may be appreciated, it is necessary for the master control system to "how" the angular location of the columns 14 of shelf units 12 relative to the robotic manipulator—i.e., so that the carousel is rotated the correct angular distance to orient the proper column 14 of shelf units 12 in confronting relationship to the robotic manipulator. According to the present invention, the master control system may be provided with such positional location by means of paired, vertically separated position indicators 30 and position sensors 32, only a representative few of which are shown in FIG. 2.

Figure 2:
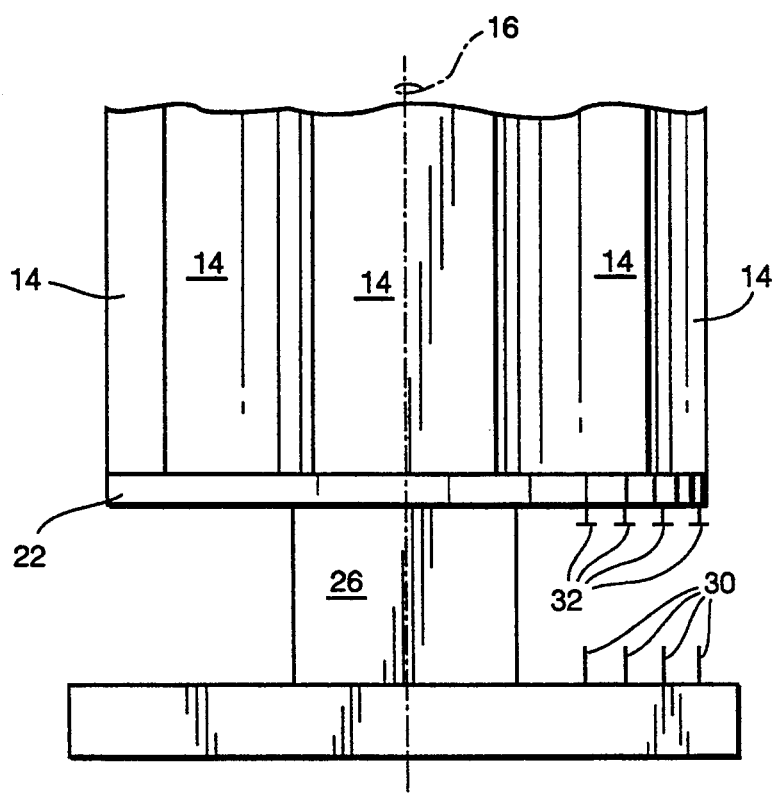
FIG. 2 is a partial side elevational view of the bottom section of the storage carousel depicted in FIG. 1.

As is schematically represented in FIG. 2, pairs of indicators and sensors 30, 32, respectively, are disposed about the general periphery of the carousel 10 at its bottom end such that the indicators 30 and sensors 32 project toward one another. That is, each of the indicators 30 are in fixed-position relative to one another and relative to the rotatable shelf units 12, while each of the sensors 32 are in fixed position relative to one another but are rotatable with the carousel. Hence, relative rotational movement is effected as between the indicators and sensors 30, 32, respectively. Moreover, each indicator 30 and sensor 32 is spaced-apart from angularly adjacent ones of the indicators 30 and sensors 32, respectively, by a preselected angular dimension about the periphery of the carousel 10, while the pairs of indicators 30 and sensors 32 are vertically separated (i.e., so as to allow for relative rotational motion to occur therebetween, it being understood that the vertical spacing between the indicators 30 and sensors 32 is shown in a greatly enlarged manner in FIG. 2 for clarity of presentation).

The indicators 30 are preferably formed of a suitable magnetic material whereas the sensors 32 are preferably a switch which closes in response to coming into close proximity to the magnetic field of the indicators. In use, therefore, the sensors 32 will each "close" when the carousel 10 is rotated such that the sensors are in vertical alignment with respective ones of the indicators.

The closure of the sensors 32 may thus be used to indicate the precise angular position of the carousel 10. In this regard, a number of position-determining algorithms may be envisioned. For example, if the sensors 32 and indicators 30 are provided in equal numbers about the entire periphery of the carousel, then with each closure of the sensors 32, the master control system will be informed (via signals from each of the sensors 32) that the carousel has been rotated through an angle increment $\alpha$ corresponding to the angular dimension between each indicator and sensor.

Thus, if the carousel 10 is rotated from a "zeroed" position known to the master control system, then the number of signals issued by the sensors 32 may be added or subtracted (depending upon the rotational direction of the carousel 10) by the master control system so that the precise positions of the columns 14 of shelf units 12 may be established during such rotational movement of the carousel 10. Thus, for each column 14 of shelf units 12, the master control system will be able to calculate the number of signals needed to be received when the carousel is rotated in a predetermined direction so as to place a selected one of the columns 14 in confronting relationship to the robotic manipulator.

Figure 3:
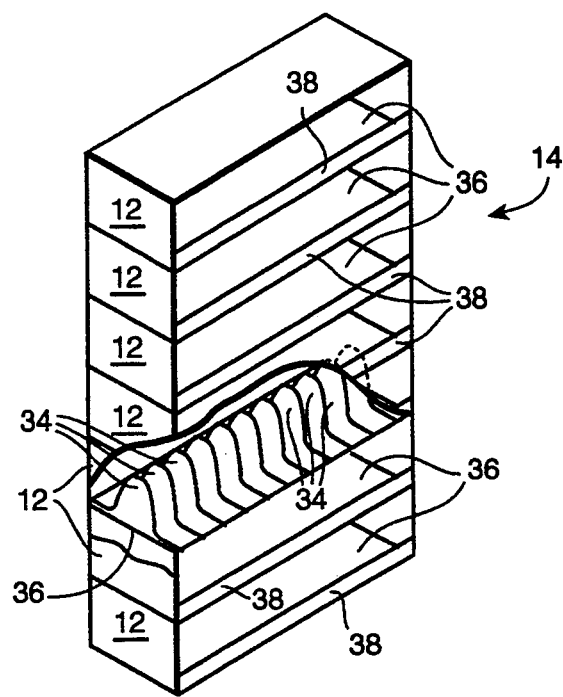
FIG. 3 is a perspective elevational view of a representative shelf unit employed in the storage carousel of FIG. 1.

A representative column 14 comprised of a number of vertically stacked shelf units 12 which may be utilized in the carousel 10 according to the present invention is shown in schematic perspective view in accompanying FIG. 3. One of the shelf units 12 is shown in accompanying FIG. 3 as being broken away so as to allow the dividers 34 to be more easily viewed, it being understood that the other shelf units 12 preferably also are provided with such dividers 34. As is seen the dividers 34 vertically project from the horizontal shelf 36 (forming the bottom wall of each shelf unit 12) and are horizontally separated one from the other by a predetermined dimension. The dividers thereby define individual spaces sized and configured so as to accept therewithin a computer tape cassette on its side edge. Usually, the individual shelf units will have a depth (i.e., a dimension as measured from front to rear) of about 135 millimeters.

It will be observed that the shelf units 12 each have an open front so as to enable the robotic manipulator to grasp individual ones of the tape cassettes supported upon the selves 36. However, in order to minimize the possibility that tape cassettes will become dislodged from the shelf units 12 in response to mechanical shocks and/or vibrations (which may occur should the robotic manipulator contact the shelf units 12, for example), a forward lip 38 projects upwardly from the front edge of each of the shelves 36. Thus, a lower portion of the cassettes 18 will abut against this lip 38 (see FIG. 1) and thereby be retained on their respective shelves 36. It should be noted here that the lip 38 only needs to project upwardly by a relatively small dimension (e.g., about 5 millimeters) in order to provide the function discussed above.

Figure 4:
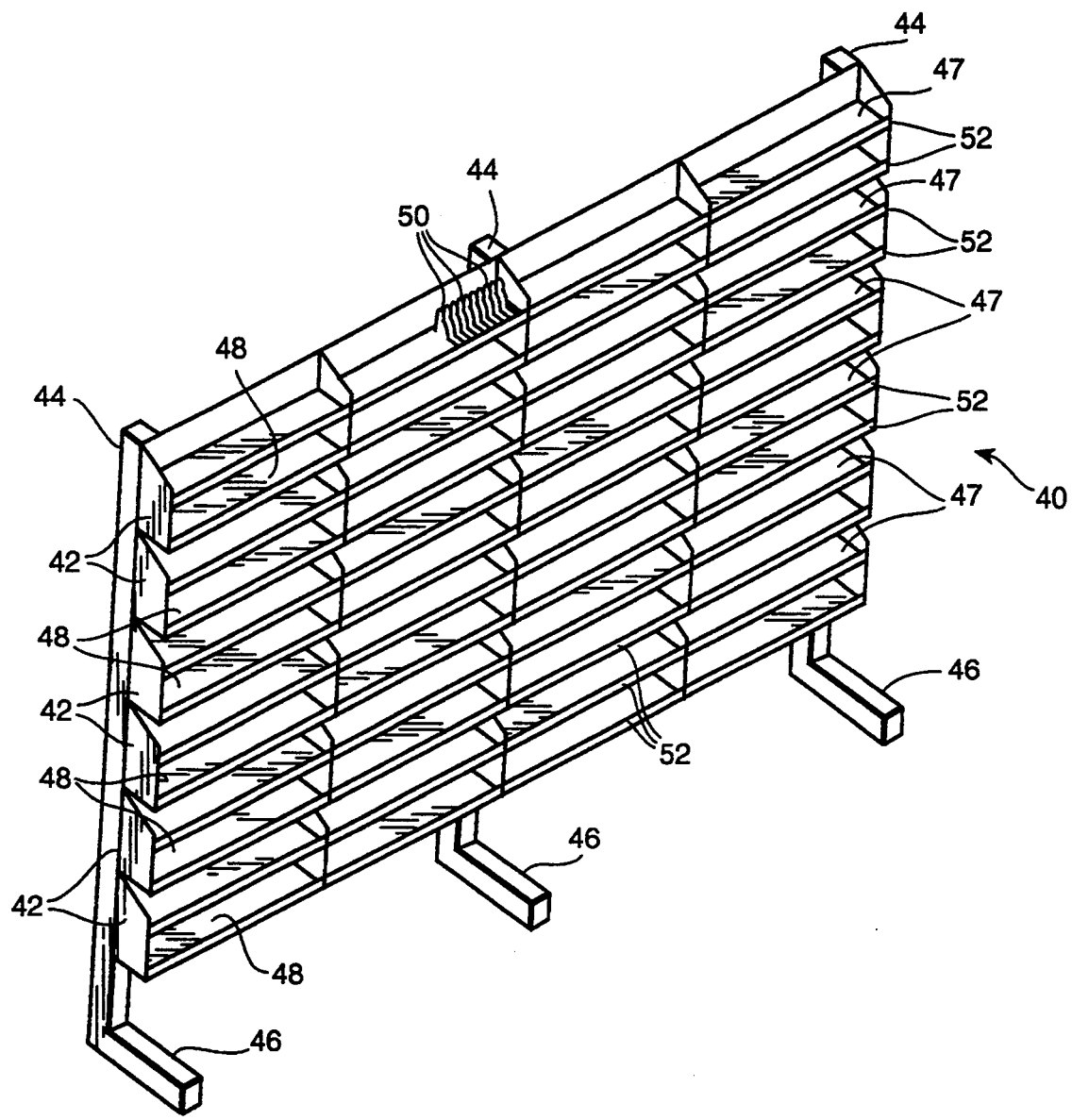
FIG. 4 is a perspective elevational view of a stationary tape cassette storage unit according to the present invention.

Accompanying FIG. 4 schematically depicts another embodiment of a tape cassette storage unit 40 according to the present invention. The storage unit 40 shown in FIG. 4 is preferably stationary (i.e., not rotatable) and may be used in those computer rooms where the increased storage capacity of the carousels 10 discussed above is not needed. The storage unit 40 generally includes a number of vertically stacked shelf units 42 fixed to upright supports 44. The lower ends 46 of supports 44 may thus be secured rigidly to the computer room floor in which the unit 40 is used.

Each of the shelf units 42 preferably includes a pair of vertically separated, horizontally parallel upper and lower shelves 47, 48. Like the carousel 10 discussed above with reference to FIGS. 1-3, the shelves 47, 48 of storage unit 40 shown in FIG. 4 will include dividers 50 (a representative few of which are only shown in FIG. 4 for clarity of presentation) so as to define spaces to accept individual computer tape cassettes on edge. Moreover, a forward lip 52 extending the horizontal dimension of each of the shelves 47, 48 is preferably provided so as to assist in retaining the tape cassettes in place during any mechanical shocks and/or vibrations which might occur during operation of the robotic manipulator.

Figure 5:
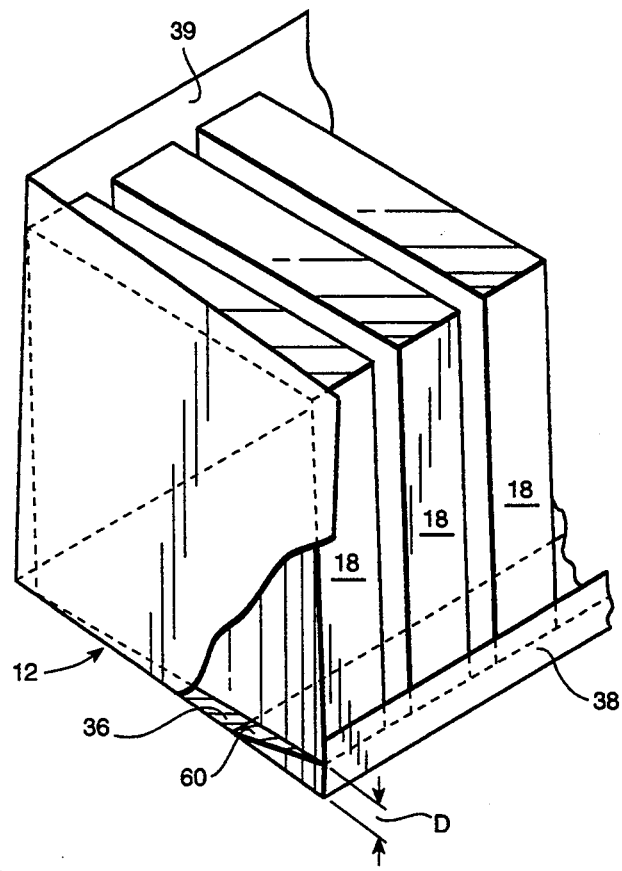
FIG. 5 is a perspective view of one possible embodiment of a tape cassette storage shelf according to the present invention.
Figure 6:
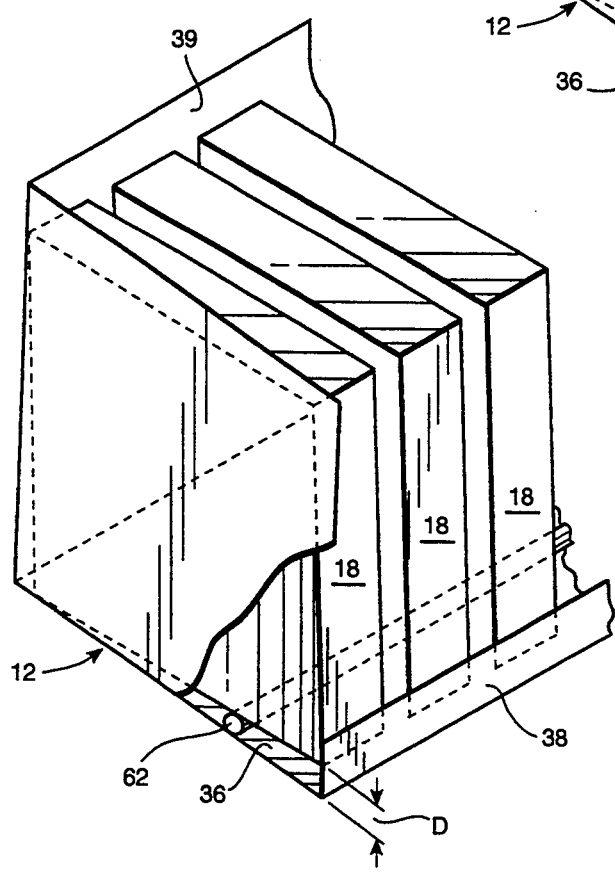
FIG. 6 is a perspective view of another possible embodiment of a tape cassette storage shelf according to the present invention.

Additional stabilization of the computer tape cassettes 18 so as to minimize the possibility that one or more of them will become dislodged from the shelf units 12 of carousel 10 (or shelf units 42 of storage unit 40) may be provided as is shown in accompanying FIGS. 5 and 6. It will be understood that, although the reference numerals employed in FIGS. 5 and 6 correspond to the rotatable tape storage carousel 10 shown in FIGS. 1-3, the structures to be discussed could also be suitably employed in the stationary tape storage unit 40 shown in FIG. 4.

As is seen in FIG. 5, the individual tape cassettes 18 are positioned on their side edges upon the shelf 36 of shelf unit 12. A lower portion of the forward ends of each tape cassette 18 thus abuts against the forward lip 38 upwardly projecting from the shelf 36. Additional stabilization of the tape cassettes 18 (i.e., so positionally retained in the shelf unit 12 even when mechanical shocks and/or vibrations are experienced) is provided by means of an upwardly inclined plate 60 upon which a forward portion of the cassette rests. The upward inclination of the plate 60 thereby raises the forward end of the tape cassettes 18 by a dimension "D" above the plane of the shelf 36. As a result, the centers of gravity of the tape cassettes are shifted rearwardly towards the rear wall 39 of the shelf unit 12. Thus, in the event that mechanical shocks and/or vibrations are experienced, the tendency of the individual cassettes 18 will be to move rearwardly towards the shelf unit's rear wall 39, instead of possibly moving forwardly towards the open front end of the shelf unit 12. As such, the cassettes 18 are reliably maintained in position upon the shelf 36 of shelf unit 12.

FIG. 6 shows one possible alternative to the inclined plate 60 discussed above in relation to FIG. 5. Thus, in order to rearwardly shift the centers of gravity of the tape cassettes 18, the embodiment of the shelf unit 12 shown in FIG. 6 employs a rod 62 extending the entire horizontal dimension of the shelf 36. Like the plate 60, the rod 62 shown in FIG. 6 serves to vertically displace a forward end of the tape cassettes 18 by a dimension "D", and thus shift the centers of gravity of the cassettes 18 towards the rear wall 39.

To advantageously utilize the interior space of a storage unit, a storage unit may be provided as shown in accompanying FIGS. 7-10. It will be understood that, although all the reference numerals of FIGS. 7-10 do not correspond to the reference numerals in FIGS. 2, 3, 5, and 6, the structures to be discussed could also suitably employ the features noted in FIGS. 2, 3, 5, and 6.

Figure 7:
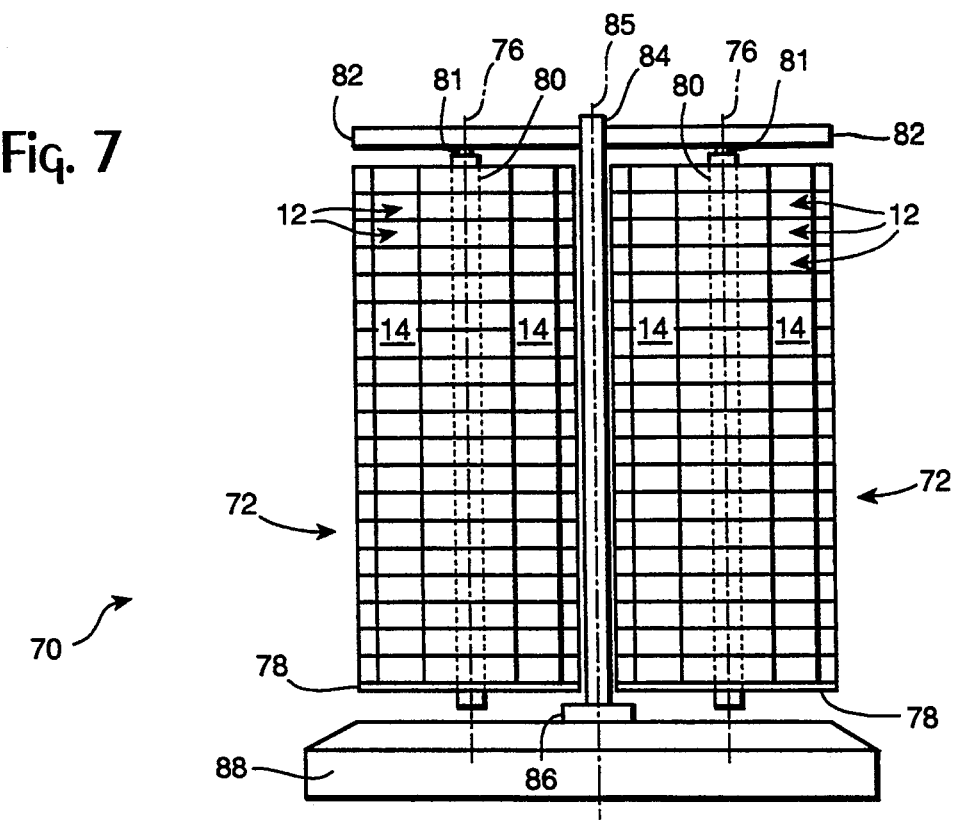
FIG. 7 is a side elevational view of a rotatable tape cassette storage unit comprising multiple rotatable carousels according to the present invention.

A cassette tape storage unit 70 according to another embodiment of the present invention is shown in accompanying FIG. 7. As is seen, the rotatable storage unit 70 includes multiple rotatable carousels 72. Each carousel 72 is generally cylindrical in configuration and includes a number of vertically stacked, open-front shelf units 12. Generally, the carousels 72 are polygonal. For a particular carousel, the stacks of shelf units 12 collectively establish respective columns 14 positioned substantially equal radial distances from the carousel's central rotation axis 76 about which the carousel 72 rotates. The individual shelf units thereby serve to support a number of computer tape cassettes (not shown) on their respective side edges in individual compartments (not shown).

The columns 14 of shelf units 12 are positionally maintained by means of a lower mounting plate 78 (and optionally with an upper mounting plate (not shown)). A carousel central shaft 80 is vertically and centrally disposed within the open interior space of the carousel 72 and is connected rigidly at its lower end to the mounting plate 78, and is journally coupled at its upper end to a carousel drive transfer mechanism 81 (not fully shown) partially housed in a generally horizontal support arm 82 which is rigidly connected to a storage unit central shaft 84. The carousel drive transfer mechanism (e.g., comprising suitable gears, belts, cables or the like housed or partially housed in the supporting framework, for example, the support arms 82 and the storage unit central shaft 84) serves to operatively couple (a) the output of a carousel drive mechanism (not shown), e.g., a secondary reversible motor, which is housed in the floor stand 88 or its vicinity, to (b) the carousel central shaft 80 so as to enable the shaft 80 (and hence the carousel 72) to rotate about axis 76. The mounting plate 78 together with the central shaft 80 thereby provide a frame onto which the shelf units may be mounted.

A storage unit central shaft 84 is vertically disposed equidistant (and within the open interior space) between carousels 72 and is connected rigidly at its upper end to the generally horizontal support arms 82 of each carousel, and is journally coupled at its lower end to a drive pedestal 86. The drive pedestal 86 is connected to a floor stand 88. The central shafts 80 of the carousels 72 are positioned substantially equal radial distances from a central rotation axis 85 of the storage unit. The central rotation axis 76 of each carousel 72 is also located at a substantially equal distance from the rotation axis 76 of each adjacent carousel 72. The carousels 72 are arranged vertically and centric with the central rotation axis 85 of the storage unit so that the rotating storage unit is subjected to approximately uniform pressures and stresses.

The storage unit central shaft 84 together with the horizontal support arms 82 thereby provide a framework which supports the carousels 72 (via the carousel central shafts 80). The drive pedestal 86 and floor stand 88 house suitable gears (or like power transmission structure). The drive pedestal 86 serves to operatively couple (a) the output of a primary reversible motor (not shown), which is housed in the floor stand 88 or its vicinity, to (b) the storage unit central shaft 84 so as to enable the shaft 84 (and hence the entire storage unit 70) to rotate about central axis 85. In addition, floor stand 88 houses suitable gears (or like power transmission structure) for operation of the carousels 72 and thereby serves to operatively couple (via gears, belts, cables, or the like (not shown), which are housed in the shaft 84 and support arms S2) the output of (a) the secondary reversible motor (not shown) to (b) the carousel central shafts 80 so as to enable the shafts 80 (and hence the carousels 72) to rotate about the carousels' central axes 76. In the case of motor failure, the storage unit 70 and the carousels 72 may be operated manually.

Preferably, independent of the radius of the storage unit 70 and the radius of the uniform carousels 72, between two and seven carousels can be arranged on one storage unit. Most preferably, four carousels 72 are arranged on one storage unit 70. In comparison with a single carousel storage unit, e.g., carousel 10 of FIG. 1, a storage unit 70 with four carousels 72 can accommodate approximately twice as many computer tape cassettes, based on an equal amount of area occupied by each respective storage unit.

In use, a computer room operator will select a particular tape cassette to be inserted into a particular tape drive unit with which the storage unit 70 is operatively associated (i.e., by inputting the identity of the tape cassette and the particular tape drive unit into a suitable master control system). The master control system will have the physical location of the tape cassette stored in memory (e.g., in an electronic "look-up" table) and will thus issue output signals to the primary and secondary motors to thereby rotate, respectively, the storage Knit 70 in a predetermined direction about axis 85 and to rotate the carousels 72 in a predetermined direction about axes 76. The storage unit 70 and carousels 72 may be operated sequentially or simultaneously. Thus, it is possible to first rotate the storage unit 70 and, subsequently, to rotate the carousels 72 or vice versa; or it is possible to rotate the storage unit 70 and carousels 72 at the same time.

The storage unit 70 and carousels 72 are thereby rotated until the desired column 14 of shelf units 12, which contains the selected tape cassette, is in confronting relationship to a robotic manipulator (not shown), at which time rotation of the storage unit 70 and carousels 72 is stopped. At that time, the master control system may then issue the appropriate commands to the robotic manipulator so that the selected tape cassette is removed from its location in the storage unit 70, transported to a selected tape drive unit, and inserted thereinto for use. Of course, re-shelving of the tape cassette after removal from the tape drive unit would proceed in an opposite manner.

As may be appreciated, it is necessary for the master control system to "how" the angular location of the columns 14 of shelf units 12 of carousels 72 relative to the robotic manipulator—i.e., so that both the carousels 72 and the storage unit 70 are rotated the correct angular distance to orient the proper column 14 of shelf units 12 in confronting relationship to the robotic manipulator. According to the present invention, the master control system may be provided with such positional location by position sensing means, e.g., vertically separated position indicators (not shown) and position sensors (not shown) similar to the indicators 30 and sensors 32 noted above and shown in FIG. 2. Alternatively, other position sensing means (e.g., electro or electromechanical means such as step motors) may be used as the carousel drive mechanism and/or the storage unit drive mechanism, for "knowledge" and manipulation of the positional location of the carousels and the storage unit.

Figure 8:
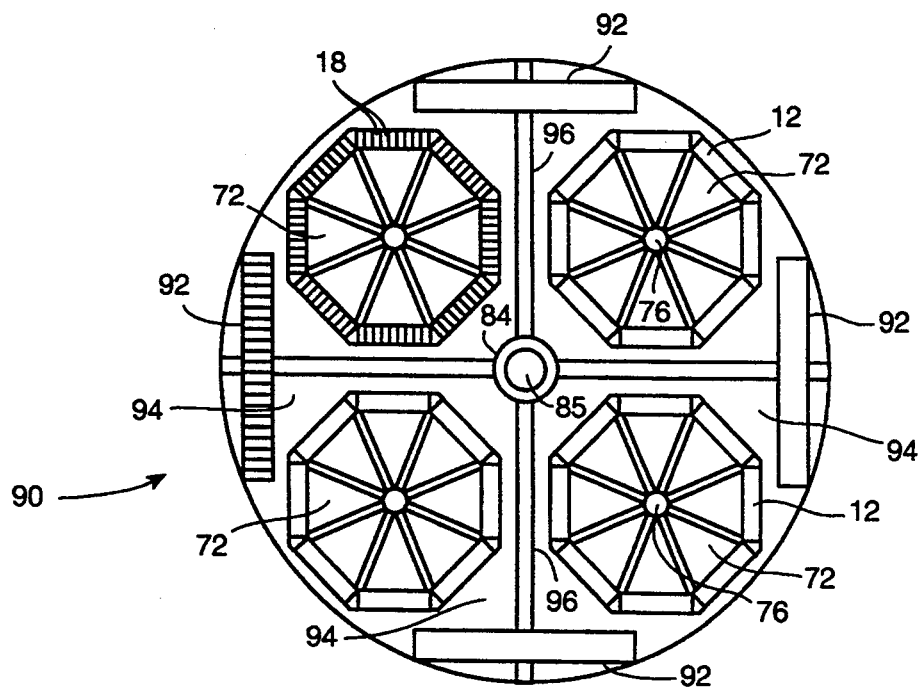
FIG. 8 is a top elevational view of a rotatable tape cassette storage unit according to the present invention, which includes four rotatable polygonal carousels and four additional secondary shelf units positioned at the outer periphery of the storage unit in the intermediate zones between adjacent carousels.

Accompanying FIG. 8 depicts a top elevational view of a further embodiment of the present invention. As is seen, a rotatable storage unit 90 includes four rotatable polygonal carousels 72 and additional secondary shelf units 92 in the intermediate zones 94 between the carousels 72 at the outer periphery of the storage unit 90. The polygonal carousels 72 are octagonal. The central rotation axes 76 of the carousels 72 are positioned substantially equal radial distances from the central rotation axis 85 of the storage unit 90. In addition, the distance between the axes 76 relative to adjacent axes 76 is substantially equal.

Each carousel 72 contains open-front shelf units 12 which serve to support a number of computer tape cassettes on their respective side edges (a representative number of tape cassettes is identified in FIG. 8 by reference numeral 18). Additional secondary shelf units 92 are rigidly connected to the storage unit's central shaft 84 by support members 96. The secondary shelf units 92 include a number of vertically stacked, open-front shelf units (not shown) that form a column and which serve to support an additional number of computer tape cassettes on their respective side edges (not shown). The substantially rectangular secondary shelf units 92 are disposed in the intermediate zones 94 formed by the carousels 72 and located at the outer periphery of the storage unit 90. The shelf units 92 are positioned in the intermediate zones 94 at the periphery of the storage unit 90 so as to avoid interference with the rotation of the carousels 72. When aligning the additional secondary shelf units 92 in confronting relationship to a robotic manipulator, only the primary/motor, which rotates the central shaft 84 of the storage unit, need be activated to properly align the predetermined secondary shelf unit.

As may be appreciated, it is necessary for the master control system to "how" the angular location of the columns of secondary shelf units 92 relative to the robotic manipulator—i.e., so that the secondary shelf units 92 are rotated the correct angular d/stance to orient the proper secondary shelf unit 92 in confronting relationship to the robotic manipulator. According to the present invention, the master control system may be provided with such positional location by position sensing means, e.g., vertically separated position indicators (not shown) and position sensors (not shown) similar to the indicators 30 and sensors 32 noted above and shown In FIG. 2.

FIG. 9 shows an alternative to the embodiment shown in FIG. 8. A rotatable storage unit 100 includes rotatable carousels 72 which are generally triangular and are positioned substantially equal radial distances from the central rotation axis 85 about which the entire storage unit rotates. Each individual carousel 72 rotates around a rotation axis 76 as in the other embodiments of this invention. As in FIG. 8, storage unit 100 includes four secondary shelf units 92 in the intermediate zones 94 between the carousels 72 at the outer periphery of the storage unit 100.

FIG. 10 shows another possible alternative to the embodiments shown in FIG. 8. A rotatable storage unit 110 includes rotatable carousels 72 which are generally square and are positioned substantially equal radially distances from the central rotation axis 85 about which the entire storage unit rotates. Each individual carousel 72 rotates around a rotation axis 76. Secondary shelf units 92 are positioned in the intermediate zones 94 between the carousels 72 at the outer periphery of the storage unit 110. The secondary shelf units 92 are rigidly connected to support members 96 extending horizontally from a central shaft 124 of storage unit 110.

As evidenced by FIGS. 8, 9, and 10, the configuration of the carousels may vary, e.g., from cylindrically round to triangular, square, or polygonal. The structure that is selected depends on the dimensions of the shelf units that are arranged in the carousels. The shelf units may be made of any durable material, e.g., metal or plastic. Preferably, the shelf units in a particular carousel have uniform dimensions and can, if necessary, be easily replaced.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A storage unit for storing a number of data storage cassettes and for presenting individual ones of the data storage cassettes at an access position where the cassettes may be grasped and removed from the storage unit, said storage unit comprising:
   a plurality of storage columns, each column comprising a plurality of vertically stacked shelf units each including generally horizontally disposed cassettes compartments for storing a number of data storage cassettes on edge in a row such that in each column said data storage cassettes are arranged in a vertical storage plane, each of said shelf units including;
   (i) a horizontal bottom wall supporting each of said data storage cassettes on one side edge,
   (ii) an open front so as to enable individual ones of said storage cassettes to be grasped and removed from the shelf units, and
   (iii) a retaining element projecting upwardly from said bottom wall for retaining each cassette on said bottom wall and so substantially preventing said tape cassettes from becoming dislodged from said shelf units by shock,
   wherein said storage unit further comprises,
   a frame defining a central axis for mounting said plurality of columns a radial dimension from said central axis so that said plurality of columns are rotatable about said central axis;
   a motor drive unit operatively coupled to said frame for rotating said columns about said central axis so that a selected one of said columns and individual ones of said data storage cassettes stored therein may be moved into said access position; and
   an automated master control unit electrically interconnected to said motor drive unit, said master control unit issuing a control signal to said motor drive unit which responsively causes said motor drive unit to effect preselected annular movement of said columns about said central axis so as to thereby controllably move said selected one of said plurality of columns into said access position to thereby present said individual ones of said data storage cassettes in said selected one of said columns at said access position, whereby said individual ones of said data storage cassettes may be grasped and removed from said selected one of said columns.

2. A storage unit for storing a number of data storage cassettes and for presenting individual ones of the data storage cassettes at an access position where the cassettes may be grasped and removed from the storage unit, said storage unit comprising:
   a plurality of storage columns, each column comprising a plurality of vertically stacked shelf units each including generally horizontally disposed cassette compartments for storing a number of data storage cassettes on edge in a row such that in each column said data storage cassettes are arranged in a vertical storage plane, each of said shelf units including;
   (i) a horizontal bottom wall supporting each of said data storage cassettes on one side edge,
   (ii) an open front so as to enable individual ones of said storage cassettes to be grasped and removed from the shelf units, and
   (iii) a retaining element projecting upwardly from said bottom wall for retaining at least one of said cassettes and so substantially preventing said tape cassettes from becoming dislodged from said shelf unit by shock,
   wherein said storage unit further comprises,
   a frame defining a central axis for mounting said plurality of columns a radial dimension from said central axis so that said plurality of columns are rotatable about said central axis;
   a drive unit which includes a motor having an output coupled operatively to said frame for rotating said frame, and thus said columns, about said central axis so that a selected one of said columns and individual ones of said data storage cassettes stored therein may be moved into said access position; and
   a master control unit electrically interconnected with said drive unit, said master control unit issuing a command signal to said drive unit for effecting preselected angular movement of said columns about said central axis to thereby controllably move said selected one of said plurality of columns into said access position to thereby present said individual ones of said data storage cassettes in said selected one of said columns at said access position, whereby said individual ones of said data storage cassettes may be grasped and removed from said selected one of said columns.

3. A storage unit for storing a number of data storage cassettes and for presenting individual ones of the data storage cassettes at an access position where the cassettes may be grasped and removed from the storage unit, said storage unit comprising:
   a plurality of storage columns, each column comprising a plurality of vertically stacked shelf units each including generally horizontally disposed cassette compartments for storing a number of data storage cassettes on edge in a row such that in each column said data storage cassettes are arranged in a vertical storage plane, each of said shelf units including;
   (i) a horizontal bottom wall supporting each of said data storage cassettes on one side edge,
   (ii) an open front so as to enable individual ones of said storage cassettes to be grasped and removed from the shelf units, and
   (iii) a retaining element projecting upwardly from said bottom wall for retaining at least one of said cassettes by interacting with a lower position of each cassette arranged on said bottom wall and so substantially preventing said tape cassettes from becoming dislodged from said shelf units by shock,
   wherein said storage unit further comprises,
   a frame defining a central axis for mounting said plurality of columns a radial dimension from said central axis so that said plurality of columns are rotatable about said central axis;

a motor drive unit operatively coupled to said frame for rotating said columns about said central axis so that a selected one of said columns and individual ones of said data storage cassettes stored therein may be moved into said access position; and an automated master control unit electrically interconnected to said motor drive unit, said master control unit issuing a control signal to said motor drive unit which responsively causes said motor drive unit to effect preselected angular movement of said columns about said central axis so as to thereby controllably move said selected one of said plurality of columns into said access position to thereby present said individual ones of said data storage cassettes in said selected one of said columns at said access position, whereby said individual ones of said data storage cassette may be grasped and removed from said selected one of said columns.

4. A storage unit for storing a number of data storage cassettes and for presenting individual ones of the data storage cassettes at an access position where the cassettes may be grasped and removed from the storage unit, said storage unit comprising:

a plurality of storage columns, each column comprising a plurality of vertically stacked shelf units each including generally horizontally disposed cassette compartments for storing a number of data storage cassettes on edge in a row such that in each column said data storage cassettes are arranged in a vertical storage plane, each of said shelf units including;

(i) a horizontal bottom wall supporting each of said data storage cassettes on one side edge, (ii) an open front so as to enable individual ones of said storage cassettes to be grasped and removed from the shelf units, and (iii) a retainer projecting upwardly from said bottom wall for retaining said cassettes and so substantially preventing said tape cassettes from becoming dislodged from said shelf units by shock, wherein said storage unit further comprises, a frame defining a central axis for mounting said plurality of columns a radial dimension from said central axis so that said plurality of columns are rotatable about said central axis;

a drive unit which includes a motor having an output coupled operatively to said frame for rotating said frame, and thus said columns, about said central axis so that a selected one of said columns and individual ones of said data storage cassettes stored therein may be moved into said access position; and a master control unit electrically interconnected with said drive unit, said master control unit issuing a command signal to said drive unit for effecting preselected angular movement of said columns about said central axis to thereby controllably move said selected one of said plurality of columns into said access position to thereby present said individual ones of said data storage cassettes in said selected one of said columns at said access position, whereby said individual ones of said data storage cassettes may be grasped and removed from said selected one of said columns.

* * * * *